United States Patent
Dolan et al.

(10) Patent No.: US 11,100,468 B2
(45) Date of Patent: Aug. 24, 2021

(54) DOCUMENT MANAGEMENT FOR INGREDIENT SUPPLIERS

(71) Applicant: Information Exchange Holdings Inc., Wilmington, DE (US)

(72) Inventors: Andrew J. Dolan, Arvada, CO (US); Gary Nowacki, Exeter, NH (US)

(73) Assignee: Information Exchange Holdings Inc., Wilmington, DE (US)

( * ) Notice: Subject to any disclaimer, the term of this patent is extended or adjusted under 35 U.S.C. 154(b) by 0 days.

(21) Appl. No.: 17/001,109

(22) Filed: Aug. 24, 2020

(65) Prior Publication Data
US 2021/0049552 A1 Feb. 18, 2021

Related U.S. Application Data

(63) Continuation of application No. 15/886,230, filed on Feb. 1, 2018, now Pat. No. 10,783,495, which is a continuation of application No. 14/510,764, filed on Oct. 9, 2014, now abandoned.

(60) Provisional application No. 61/986,625, filed on Apr. 30, 2014.

(51) Int. Cl.
*G06Q 10/10* (2012.01)

(52) U.S. Cl.
CPC .................................. *G06Q 10/10* (2013.01)

(58) Field of Classification Search
CPC ..................................................... G06Q 10/10
USPC ........................................................ 705/342
See application file for complete search history.

(56) References Cited

U.S. PATENT DOCUMENTS

| | | | |
|---|---|---|---|
| 5,231,566 A | 7/1993 | Blutinger et al. | |
| 5,913,210 A | 6/1999 | Call | |
| 5,972,641 A | 10/1999 | Øfjord et al. | |
| 6,356,909 B1 | 3/2002 | Spencer | |
| 6,375,077 B1 | 4/2002 | Hankins | |
| 6,654,736 B1 | 11/2003 | Ellis et al. | |
| 6,983,278 B1 | 1/2006 | Yu | |
| 7,321,866 B2 | 1/2008 | Kuwana et al. | |
| 7,412,461 B2 | 8/2008 | Sholl et al. | |
| 7,970,731 B2 | 6/2011 | Potts et al. | |
| 8,744,937 B2 | 6/2014 | Seubert | |
| 9,823,813 B2 * | 11/2017 | Beechuk | G06Q 50/01 |

(Continued)

FOREIGN PATENT DOCUMENTS

WO WO 2014/066958 5/2014

*Primary Examiner* — William D Titcomb
(74) *Attorney, Agent, or Firm* — Fish & Richardson P.C.

(57) ABSTRACT

Methods, systems, and apparatus, including computer programs encoded on a computer storage device, for receiving a first request for a particular document relating to a food ingredient supplier or an ingredient supplied by the food ingredient supplier, from a first customer of the food ingredient supplier, receiving a second request for the particular document, from a different, second customer of the food ingredient supplier, providing, to the food ingredient supplier, an interface including a representation of the first and second requests, receiving, from the food ingredient supplier, the document relating to the food ingredient supplier or the ingredient supplier by the food ingredient supplier, and an indication that the document is to be distributed to both the first customer and the second customer, and in response to indication, providing the document to both the first customer and the second customer.

20 Claims, 14 Drawing Sheets

(56) References Cited

U.S. PATENT DOCUMENTS

| | | |
|---|---|---|
| 10,783,495 B1 * | 9/2020 | Dolan .................... G06Q 10/10 |
| 2002/0010708 A1 | 1/2002 | McIntosh |
| 2002/0049643 A1 | 4/2002 | Church |
| 2002/0107775 A1 | 8/2002 | Hawkins |
| 2002/0158765 A1 | 10/2002 | Pape et al. |
| 2003/0018513 A1 | 1/2003 | Hoffman et al. |
| 2003/0069795 A1 | 4/2003 | Boyd et al. |
| 2003/0177025 A1 | 9/2003 | Curkendall et al. |
| 2004/0093340 A1 | 5/2004 | Edmondson et al. |
| 2004/0098282 A1 | 5/2004 | Levy et al. |
| 2004/0098663 A1 | 5/2004 | Rey et al. |
| 2004/0267583 A1 | 12/2004 | Hornbacher et al. |
| 2005/0251449 A1 | 11/2005 | Pape et al. |
| 2006/0059009 A1 | 3/2006 | Potts et al. |
| 2006/0190494 A1 | 8/2006 | Beck et al. |
| 2007/0033108 A1 | 2/2007 | Luhr |
| 2007/0033143 A1 * | 2/2007 | Saito .................... G06Q 10/10 705/51 |
| 2007/0050229 A1 | 3/2007 | Tatro et al. |
| 2007/0067125 A1 | 3/2007 | Guivarch et al. |
| 2007/0067177 A1 | 3/2007 | Martin et al. |
| 2007/0162417 A1 | 7/2007 | Cozianu et al. |
| 2008/0030348 A1 | 2/2008 | Pape |
| 2008/0104408 A1 | 5/2008 | Mayer |
| 2008/0306966 A1 | 12/2008 | Culot et al. |
| 2009/0100367 A1 | 4/2009 | Dargahi |
| 2009/0171718 A1 | 7/2009 | Barlow |
| 2009/0198541 A1 | 8/2009 | Dolan et al. |
| 2009/0240541 A1 | 9/2009 | Smith |
| 2010/0036695 A1 | 2/2010 | Kepler |
| 2010/0198605 A1 | 8/2010 | Saulet |
| 2011/0218885 A1 | 9/2011 | Manski et al. |
| 2012/0016707 A1 | 1/2012 | Waldo |
| 2012/0030059 A1 | 2/2012 | McCormick et al. |
| 2012/0158602 A1 | 6/2012 | Dolan et al. |
| 2012/0166954 A1 | 6/2012 | Roth |
| 2012/0209890 A1 | 8/2012 | Nowacki et al. |
| 2012/0240243 A1 | 9/2012 | Allardyce |
| 2012/0254842 A1 | 10/2012 | Henderson |
| 2012/0323809 A1 | 12/2012 | Fukui |
| 2013/0013525 A1 | 1/2013 | Dlott et al. |
| 2013/0024795 A1 | 1/2013 | Robotham |
| 2013/0067017 A1 | 3/2013 | Carriere |
| 2013/0124369 A1 | 5/2013 | Furuichi |
| 2013/0124457 A1 | 5/2013 | Parker |
| 2014/0047368 A1 | 2/2014 | Yang |
| 2014/0280134 A1 * | 9/2014 | Horen .................... G06Q 50/01 707/736 |
| 2014/0282163 A1 | 9/2014 | MacKinlay |
| 2016/0063440 A1 * | 3/2016 | Webb .................... H04L 65/403 705/7.24 |

\* cited by examiner

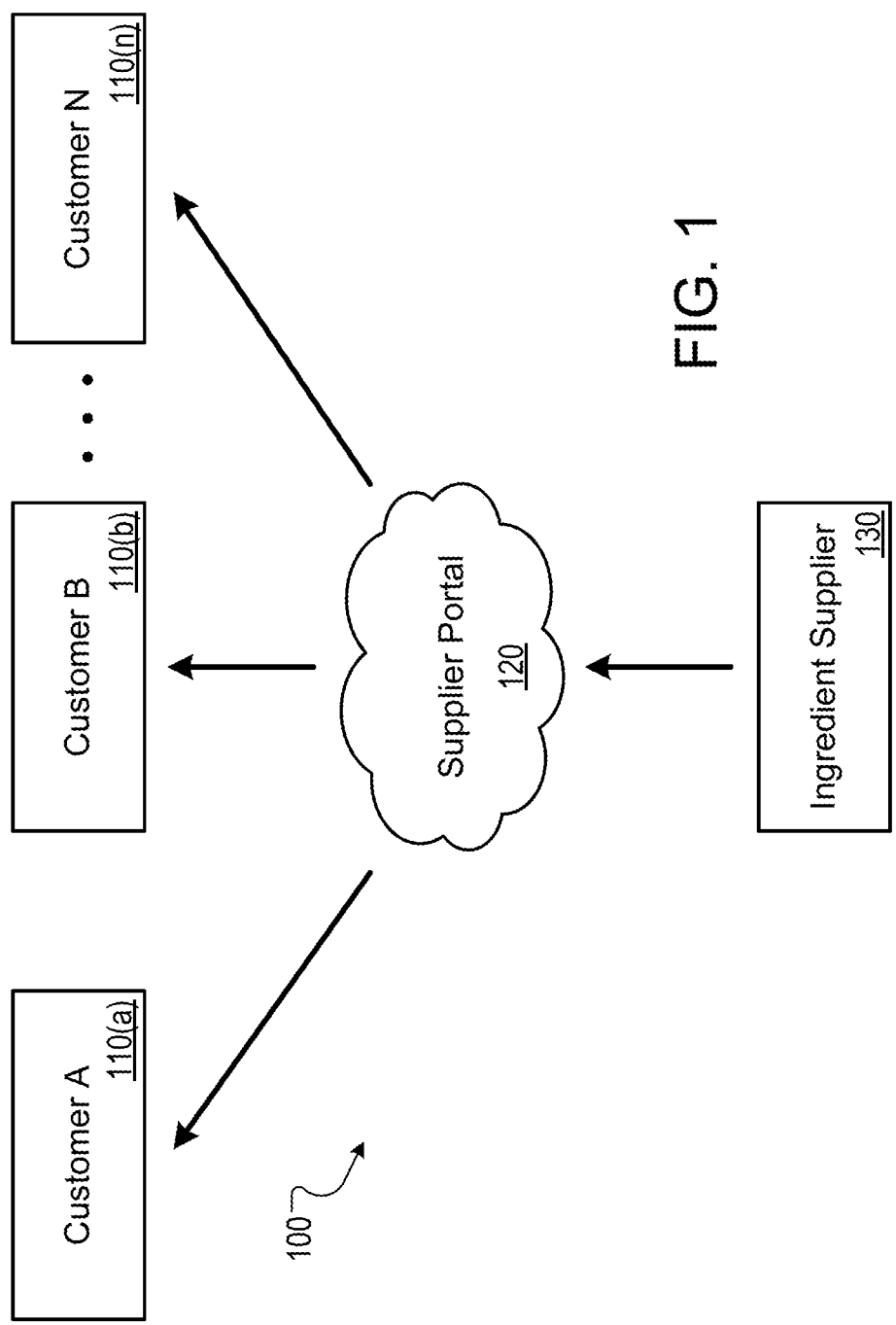

FIG. 2B

| FILE EDIT VIEW FAVORITES TOOLS HELP | | | | | | | | SUPPLIER ABC | | | | | | WELCOME BACK RICHARD | LOG OUT |
|---|---|---|---|---|---|---|---|---|---|---|---|---|---|---|---|
| HOME | MY DOCUMENTS | MY ACCOUNT | HELP | | | | | | | | | | | | |
| | | | | | | | | DROP FILES HERE | | | | | | | |
| SELECT | EDIT | COMPANY NAME ▲ | SUPPLIER ID | SUPPLIER NAME | SUPPLIER GROUP | ITEM ID | ITEM NAME | ITEM GROUP | STATUS | IS REQUIRED | DOCUMENT GROUP | WORK FLOW | EFFECTIVE DATE | EXPIRATION DATE | FILE NAME | DESCRIPTION | LAST DOWNLOAD BY | LAST DOWNLOAD ON | LAST ACKN |
| ☐ | | | | | | | | | MISSING | | | | | | | | | | |
| ☐ | ⊛ | AMERICAN EARTH FOODS | 025707 | SUPPLIERABC | | 1 CS01 | DRIED CHICKEN STOCK | | MISSING | TRUE | HACCP | | | | | | | | |
| ☐ | ⊛ | BYCO | 032717 | SUPPLIERABC | | 1 RA13 | RED RASPBERRY JUICE 66 BRIX | | MISSING | TRUE | HACCP | | | | | | | | |
| ☐ | ⊛ | BYCO | 032717 | SUPPLIERABC | | 1 RA13 | RED RASPBERRY JUICE 66 BRIX | | MISSING | TRUE | KOSHER | | | | | | | | |
| ☐ | ⊛ | CLEMENTINE SNACKS NA | 044727 | SUPPLIERABC | | 1 BL22 | BLUEBERRY ESSENCE 150 FOLD | | MISSING | TRUE | HACCP | | | | | | | | |
| ☐ | ⊛ | CLEMENTINE SNACKS NA | 044727 | SUPPLIERABC | | 1 CS01 | DRIED CHICKEN STOCK | | MISSING | TRUE | HACCP | | | | | | | | |
| ☐ | ⊛ | FLAVOR CHAIN INGREDIENTS | 053737 | SUPPLIERABC | | 1 CS01 | DRIED CHICKEN STOCK | | MISSING | TRUE | HACCP | | | | | | | | |
| ☐ | ⊛ | HI AMERICAN PRODUCTS | 086747 | SUPPLIERABC | | 1 RA13 | RED RASPBERRY JUICE 66 BRIX | | MISSING | TRUE | HACCP | | | | | | | | |
| ☐ | ⊛ | HI AMERICAN PRODUCTS | 086747 | SUPPLIERABC | | 1 BL22 | BLUEBERRY ESSENCE 150 FOLD | | MISSING | TRUE | HACCP | | | | | | | | |
| ☐ | ⊛ | HONDO FOOD DISTRIBUTORS | 088757 | SUPPLIERABC | | 1 CS01 | DRIED CHICKEN STOCK | | MISSING | TRUE | HACCP | | | | | | | | |

|◄ ◄ 1 ► ►| PAGE SIZE: 50 ▼   SHOWING 9 ITEMS IN 1 PAGE

⊕ ATTACH NEW  ✎ EDIT SELECTED  💾 SAVE  ✉ EMAIL SELECTED  ⬇ DOWNLOAD SELECTED  ⊞ EXPORT GRID  ⚙ APPLY FILTERS  ⊘ CLEAR FILTERS

SUPPLIER ABC

WELCOME BACK RICHARD    LOG OUT

FILE  EDIT  VIEW  FAVORITES  TOOLS  HELP

HOME | MY DOCUMENTS | MY ACCOUNT | HELP

DROP FILES HERE

| SELECT | EDIT | COMPANY NAME ▲ | SUPPLIER ID | SUPPLIER NAME | SUPPLIER GROUP | ITEM ID | ITEM NAME | ITEM GROUP | STATUS | IS REQUIRED | DOCUMENT GROUP | WORK FLOW | EFFECTIVE DATE | EXPIRATION DATE | FILE NAME | DESCRIPTION | LAST DOWNLOAD BY | LAST DOWNLOAD ON |
|---|---|---|---|---|---|---|---|---|---|---|---|---|---|---|---|---|---|---|
| ☐ | | | | | | | | | MISSING | | | | | | | | | |
| ☐ | ⚙ | AMERICAN EARTH FOODS | 025707 | SUPPLIERABC | | 1CS01 | DRIED CHICKEN STOCK | | MISSING | TRUE | HACCP | | | | | | | |
| ☐ | ⚙ | BYCO | 032717 | SUPPLIERABC | | 1RA13 | RED RASPBERRY JUICE 65 BRIX | | MISSING | TRUE | HACCP | | | | | | | |
| ☐ | ⚙ | CLEMENTINE SNACKS NA | 044727 | SUPPLIERABC | | 1BL22 | BLUEBERRY ESSENCE 150 FOLD | | MISSING | TRUE | HACCP | | | | | | | |
| ☐ | ⚙ | CLEMENTINE SNACKS NA | 044727 | SUPPLIERABC | | 1CS01 | DRIED CHICKEN STOCK | | MISSING | TRUE | HACCP | | | | | | | |
| ☐ | ⚙ | FLAVOR CHAIN INGREDIENTS | 053737 | SUPPLIERABC | | 1CS01 | DRIED CHICKEN STOCK | | MISSING | TRUE | HACCP | | | | | | | |
| ☐ | ⚙ | H AMERICAN PRODUCTS | 086747 | SUPPLIERABC | | 1RA13 | RED RASPBERRY JUICE 65 BRIX | | MISSING | TRUE | HACCP | | | | | | | |
| ☐ | ⚙ | H AMERICAN PRODUCTS | 086747 | SUPPLIERABC | | 1BL22 | BLUEBERRY ESSENCE 150 FOLD | | MISSING | TRUE | HACCP | | | | | | | |
| ☐ | ⚙ | HONDO FOOD DISTRIBUTORS | 088757 | SUPPLIERABC | | 1CS01 | DRIED CHICKEN STOCK | | MISSING | TRUE | HACCP | | | | | | | |

|◀ ◀ 1 ▶ ▶| PAGE SIZE: 50 ▼

ATTACH NEW | EDIT SELECTED | SAVE | EMAIL SELECTED | DOWNLOAD SELECTED | EXPORT GRID | APPLY FILTERS | CLEAR FILTERS

SHOWING 8 ITEMS IN 1 PAGE

SUPPLIER ABC

| SELECT | EDIT | COMPANY NAME ▲ | SUPPLIER ID | SUPPLIER NAME | SUPPLIER GROUP | ITEM ID | ITEM NAME | ITEM GROUP |
|---|---|---|---|---|---|---|---|---|
| ☒ | ❀ | AMERICAN EARTH FOODS | 025707 | SUPPLIERABC | | 1AB2F | ACETAL | |
| ☐ | ❀ | AMERICAN EARTH FOODS | 025707 | SUPPLIERABC | | 7GH2 | OLIVE OIL | |
| ☐ | ❀ | AMERICAN EARTH FOODS | 025707 | SUPPLIERABC | | R2001 | RED WHEAT FLOUR | |
| ☐ | ❀ | AMERICAN EARTH FOODS | 025707 | SUPPLIERABC | | 1CS01 | DRIED CHICKEN STOCK | |
| ☐ | ❀ | AMERICAN EARTH FOODS | 025707 | SUPPLIERABC | | 0001A | GRANULATED SUGAR | |
| ☐ | ❀ | AMERICAN EARTH FOODS | 025707 | SUPPLIERABC | | 1BA00 | NAT.BACON FAT | |
| ☐ | ❀ | BYCO | 032717 | SUPPLIERABC | | H45R | NATURAL ACETOIN | |
| ☐ | ❀ | BYCO | 032717 | SUPPLIERABC | | 81H3 | FROZEN ACAI PULP | |
| ☒ | ❀ | BYCO | 032717 | SUPPLIERABC | | H800 | ACETAL | |
| ☐ | ❀ | BYCO | 032717 | SUPPLIERABC | | 9980 | OLIVE OIL | |
| ☐ | ❀ | BYCO | 032717 | SUPPLIERABC | | R2001 | RED WHEAT FLOUR | |
| ☐ | ❀ | BYCO | 032717 | SUPPLIERABC | | 1RA13 | RED RASPBERRY JUICE 65 BRIX | |
| ☐ | ❀ | BYCO | 032717 | SUPPLIERABC | | 0001A | GRANULATED SUGAR | |
| ☐ | ❀ | CLEMENTINE SNACKS NA | 044727 | SUPPLIERABC | | 1BL22 | BLUEBERRY ESSENCE 130 FOLD | |
| ☒ | ❀ | CLEMENTINE SNACKS NA | 044727 | SUPPLIERABC | | Z4800 | ACETAL | |
| ☐ | ❀ | CLEMENTINE SNACKS NA | 044727 | SUPPLIERABC | | BL004 | OLIVE OIL | |
| ☐ | ❀ | CLEMENTINE SNACKS NA | 044727 | SUPPLIERABC | | 00122 | RED WHEAT FLOUR | |
| ☐ | ❀ | CLEMENTINE SNACKS NA | 044727 | SUPPLIERABC | | 1BL22 | BLUEBERRY ESSENCE 130 FOLD | |

| SELECT | EDIT | GROUP | HID ▲ | NAME |
|---|---|---|---|---|
| ☐ | ❀ | SUB-ASSEMBLY | 001-FIN INGRED | CORN FLAKES - 16 OUNCE |
| ☐ | ❀ | OIL | 1928OL | OLIVE OIL |
| ☐ | ❀ | | 1AC00 | ACETAL |
| ☐ | ❀ | | 1AC01 | NAT.ACETAL (35% AS |
| ☐ | ❀ | | 1AC03 | 2 ACETYL FURAN OR 2 F |
| ☐ | ❀ | | 1AC04 | ACESULFAME-K |
| ☐ | ❀ | | 1AC06 | FROZEN ACAI PULP |
| ☐ | ❀ | | 1AC07 | NATURAL ACETALDEHYDE 5 |
| ☐ | ❀ | | 1AC08 | NATURAL ACETOPHENONE |
| ☐ | ❀ | | 1AC10 | ACETALDEHYDE |
| ☐ | ❀ | | 1AC12 | NAT. 50% ACETALDEH |
| ☐ | ❀ | | 1AC15 | ACETANISOLE |
| ☐ | ❀ | | 1AC19 | 3-METHYLTHIOHEX-1-Y |
| ☐ | ❀ | | 1AC20 | ACETATE C-8 (OCTYL A |
| ☐ | ❀ | | 1AC25 | FRK - ACETIC ACID GL |
| ☐ | ❀ | | 1AC27 | FRK - NATURAL ACETIC |
| ☐ | ❀ | | 1AC31 | NATURAL ACETOIN |

FIG. 3C

DOCUMENT MANAGEMENT FOR INGREDIENT SUPPLIERS

CROSS-REFERENCE TO RELATED APPLICATION

This application is a continuation of U.S. application Ser. No. 15/886,230, filed Feb. 1, 2018, now allowed, which is a continuation of U.S. application Ser. No. 14/510,764, filed Oct. 9, 2014, now abandoned, which claims the benefit of U.S. Provisional Patent Application No. 61/986,625, filed Apr. 30, 2014, and titled "Document Management for Ingredient Suppliers," all of which is incorporated by reference in its entirety for all purposes.

TECHNICAL FIELD

This document relates to document management.

BACKGROUND

Food vendors, such as restaurants, manufacturers, bakeries, and the like, typically offer products that include a number of ingredients. In some instances, suppliers of these ingredients are required to demonstrate that the ingredients satisfy certain standards of quality, are required to demonstrate certain characteristics of the products they sell, or are required to demonstrate other information relating to the ingredients that they provide to food vendors, such as insurance information or certifications associated with the ingredients. Suppliers can provide their customers, namely the food vendors, with documents that demonstrate that the ingredients being supplied to these customers satisfy the prescribed requirements, or can provide the customers with other documents associated with the production, quality, and/or sale of the goods purchased by the customers.

SUMMARY

A supplier portal can enable an ingredient supplier to manage documents relating to the ingredients that is produces and/or supplies to customers. Such ingredients can include, for example, ingredients relating to the production of foods or other goods relating to the packaging of foods. Customers of the ingredient supplier, such as one or more food vendors, can identify ingredients that they purchase from the ingredient supplier. The ingredient supplier can maintain documents relating to the ingredients that it produces and/or supplies and can provide the documents to one or more customers at once. For example, the ingredient supplier can simultaneously provide a new document or a new version of a document relating to a particular ingredient to all of the customers that purchase that ingredient from the supplier. In other instances, customers of the ingredient supplier can request particular documents relating to the ingredients that it purchases from the supplier. The supplier can receive those requests, and can respond to the requests by providing the customers with the requested documents.

Innovative aspects of the subject matter described in this specification may be embodied in methods that include the actions of receiving a first request for a particular document relating to a food ingredient supplier or an ingredient supplied by the food ingredient supplier, from a first customer of the food ingredient supplier, receiving a second request for the particular document relating to the food ingredient supplier on the ingredient supplied by the food ingredient supplier, from a different second customer of the food ingredient supplier, providing, to the food ingredient supplier, an interface including a representation of the first request and a representation of the second request, receiving, from the food ingredient supplier, the document relating to the food ingredient supplier or the ingredient supplied by the food ingredient supplier, and an indication that the document is to be distributed to both the first customer and the second customer, and in response to the indication, providing the document to both the first customer and the second customer.

Other embodiments of these aspects include corresponding systems, apparatus, and computer programs, configured to perform the actions These and other embodiments may each optionally include one or more of the following features. In various examples, the document is one of a certificate of analysis, a kosher certificate, an insurance certificate, a hazard analysis and critical control points document, a supplier agreement, a receipt, an audit certificate, or a contract; receiving a third request for the particular document relating to the food ingredient supplier or the ingredient supplied by the food ingredient supplier, from a different, third customer of the food ingredient supplier, providing, to the food ingredient supplier, an interface including a representation of the first request, the second request, and the third request, receiving, from the food ingredient supplier, the document relating to the food ingredient supplier or the ingredient supplied by the food ingredient supplier, and an indication that the document is to be distributed to each of the first customer, the second customer, and the third customer, and in response to the indication, providing the document to each of the first customer, the second customer, and the third customer; receiving, from the food ingredient supplier, the document relating to the food ingredient supplier or the ingredient supplied by the food ingredient supplier comprises receiving, from the food ingredient supplier, information identifying one or more attributes associated with the document relating to the food ingredient supplier or the ingredient supplied by the food ingredient supplier; providing the document to both the first customer and the second customer comprises providing the document to both the first customer and the second customer using a portal interface, where the document is accessible at a cloud-based storage system associated with the portal; and the interface that includes the representation of the first request and the representation of the second request is an interface that includes representations of one or more requests received from one or more customers for documents relating to the food ingredient supplier or one or more ingredients supplied by the food ingredient supplier.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 1 is an example of a system that can utilize a supplier portal to provide document management services to ingredient suppliers;

FIGS. 2A-2J illustrate example user interfaces of a supplier portal for providing document management services to ingredient suppliers; and FIGS. 3A-3C illustrate example user interfaces of a supplier portal for providing post-once document management services to ingredient suppliers.

Like reference symbols in the various drawings indicate like elements.

DETAILED DESCRIPTION

Figure 2A:

FIG. 1 depicts a system 100 for a supplier portal that provides document management services to ingredient suppliers. As shown in FIG. 1, the system 100 can include one or more customers 110(a)-110(n), a supplier portal 120, and an ingredient supplier 130. In some implementations, the supplier portal 120 is accessible to the customers 110(a)-110(n) and the ingredient supplier 130 over one or more networks, such as one or more wide area networks (WAN), such as the Internet, or over one or more local area networks (LAN). In general, the system 100 enables the ingredient supplier 130 to provide documents relating to one or more ingredients produced by the ingredient supplier 130 to customers 110(a)-110(n) that purchase one or more ingredients from the ingredient supplier 130. Additionally, the system 100 enables the customers 110(a)-110(n) to request documents relating to one or more ingredients from the supplier 130 of those ingredients, such that the supplier 130 can respond to the request by providing the documents relating to the one or more ingredients.

The supplier portal 120 can be a resource accessible over a network, such as a website, application, or other resource. The supplier portal 120 can be associated with one or more databases, or have access to one or more other resources such as servers, web sites, etc., that are capable of storing information associated with the one or more customers 110(a)-110(n) and/or the ingredient supplier 130. For example, the supplier portal 120 can access one or more databases that store information identifying the one or more customers 110(a)-110(n), one or more ingredients purchased from the ingredient supplier 130 by the customers 110(a)-110(n), can identify one or more ingredients produced or sold by the ingredient supplier 130, or one or more documents associated with the ingredients produced or sold by the ingredient supplier 130, or can include other information related to providing a document management service for use by the one or more customers 110(a)-110(n) and the ingredient supplier 130.

In some implementations, access to the supplier portal 120 by the one or more customers 110(a)-110(n) and/or the ingredient supplier 130 is based on a service subscription such that the supplier portal 120 is provided as a Software as a Service (SaaS). In such cases, the supplier portal 120 may store and be capable of accessing information associated with subscriptions of the one or more customers 110(a)-110(n) or the ingredient supplier 130, or may store information related to billing the one or more customers 110(a)-110(n) or the ingredient supplier 130 for access to the SaaS.

In further detail, the ingredient supplier 130 may be capable of providing information to the supplier portal 120 that identifies one or more ingredients produced and/or sold by the ingredient supplier 130. For example, the ingredient supplier 130 may produce ingredients relating to food production, such as wheat, corn meal, high fructose corn syrup, flour, or any number of other ingredients, and the ingredient supplier 130 can provide information to the supplier portal 120 that identifies the ingredients produced by the ingredient supplier 130. In other examples, the ingredient supplier 130 may obtain ingredients from one or more distributors or other sources, and may resell the ingredients to the one or more customers 110(a)-110(n). In these examples, the ingredient supplier 130 may provide information to the supplier portal 120 that identifies the ingredients resold by the ingredient supplier 130. In some cases, in addition to providing ingredients relating to food production, the ingredient supplier 130 can produce and/or sell additional goods relating to the packaging of food, such as containers, food wrap, or other products used to package food goods for sale, and the ingredient supplier 130 can provide information to the supplier portal 120 that relates to the additional goods.

In addition to information identifying the ingredients produced by the ingredient supplier 130, the ingredient supplier 130 may identify one or more documents associated with the each of the ingredients produced and/or sold by the ingredient supplier. For example, documents associated with a particular ingredient may include a certificate of analysis (COA), a kosher certificate, an insurance certificate, one or more hazard analysis and critical control points (HACCP) documents, supplier agreements, third party agreements, receipts, or any other document relating to the production, sale, distribution, or quality of a particular ingredient. The documents may be provided to the supplier portal 120 such that the one or more documents relating to a particular ingredient are associated with the ingredient. For example, the documents relating to a particular ingredient may be placed into a particular registry or folder that is maintained by the supplier portal 120 and that is associated with the ingredient supplier 130 and the particular ingredient. Additionally, the ingredient supplier 130 can provide documents relating to the production and sale of the ingredients sold by the ingredient supplier 130, or can provide other business documents associated with the ingredient supplier 130, the ingredients sold by the ingredient supplier 130, and/or the customers 110(a)-110(n). Such documents may include sale agreements, contracts, audit certificates, product guarantees, and the like.

Similarly, one or more customers 110(a)-110(n) may be capable of providing information to the supplier portal 120 that identifies one or more ingredients produced and/or sold by the ingredient supplier 130 that the customers 110(a)-110(n) purchase from the ingredient supplier 130. For example, the customers 110(a)-110(n) may include food vendors, such as restaurants, bakeries, concessions, food product manufacturers, or other producers of food products. The customers 110(a)-110(n) may each purchase one or more ingredients that are produced and/or sold by the ingredient supplier 130, and the customers 110(a)-110(n) can provide information to the supplier portal 120 that identifies the ingredients that they purchase and that are produced and/or sold by the ingredient supplier 130. In addition, each of the customers 110(a)-110(n) may provide information to the supplier portal 120 that identifies one or more documents associated with each of the ingredients that they purchase and that are produced and/or sold by the ingredient supplier 130, where the one or more documents associated with the ingredients are documents that the customers 110(a)-110(n) request to receive from the ingredient supplier 130. For example, the customers 110(a)-110(n) may require particular documents associated with particular ingredients to maintain compliance with regulations or standards associated with a particular ingredient or food product, e.g., to ensure that a particular food product produced satisfies kosher requirements or HACCP requirements. Similarly, the customers 110(a)-110(n) may request other documents from the ingredient supplier 130, such as one or more contracts, third party agreements, audit certificates, product guarantees, shipping statements, quotes or estimates, and the like.

In some implementations, a particular customer $110(a)$-$110(n)$ can provide information to the supplier portal $120$ that identifies one or more ingredients and one or more documents associated with those ingredients, where the identified ingredients are produced and/or sold by the ingredient supplier $130$. After providing the information identifying the one or more ingredients and the associated documents, the particular customer $110(a)$-$110(n)$ can request a particular document from the ingredient supplier $130$ via the supplier portal $120$. The ingredient supplier $130$ can be notified of the request placed via the supplier portal $120$, and can respond to the request using the supplier portal $120$, for example, by submitting the requested document to the particular customers $110(a)$-$110(n)$ via the supplier portal $120$.

In other examples, an ingredient supplier $130$ can provide a particular document to the supplier portal $120$, where the particular document is associated with a particular ingredient that the ingredient supplier $130$ produces and/or sells. The ingredient supplier $130$ can identify, based on information provided to the supplier portal $120$ by the ingredient supplier $130$ and/or the customers $110(a)$-$110(n)$, one or more customers $110(a)$-$110(n)$ that purchase the particular ingredient from the ingredient supplier $130$. The ingredient supplier $130$ can transmit the document relating to the particular ingredient to the one or more customers $110(a)$-$110(n)$ that purchase the ingredient that the ingredient supplier $130$ produces and/or sells via the supplier portal $120$.

In some instances, the supplier portal $120$ may be capable of identifying documents associated with particular ingredients, or may be capable of determining customers $110(a)$-$110(n)$ that purchase particular ingredients, and may provide requests for documents to the ingredient supplier $130$ and/or transmit documents associated with particular ingredients to the customers $110(a)$-$110(n)$ without the explicit instruction of a user. By automatically providing requests and/or documents to the respective parties, e.g., the ingredient supplier $130$ and/or the customers $110(a)$-$110(n)$, customers $110(a)$-$110(n)$ and/or an ingredient supplier $130$ can ensure proper document management and can ensure that all necessary documents have been received or are current.

For example, a particular customer $110(a)$-$110(n)$ can provide information to the supplier portal $120$ that identifies the one or more ingredients and one or more documents associated with those ingredients, and the supplier portal $120$ can request one or more of the documents from the ingredient supplier $130$ automatically based on detecting certain events or conditions. For example, a particular document associated with a particular ingredient may have to be provided by an ingredient supplier $130$ to a customer $110(a)$-$110(n)$ periodically, e.g., every six months, based on determining that the customer $110(a)$-$110(n)$ has ordered or reordered the particular ingredient, based on the supplier portal $120$ receiving information indicating that the particular ingredient is subject to additional scrutiny, e.g., based on an organization that oversees a food industry issuing a warning or other notification relating to the safety of the particular ingredient, or based on detecting other events. Based on detecting an event that requires the ingredient supplier $130$ to provide the customer $110(a)$-$110(n)$ with the document, the supplier portal $120$ can automatically request the document from the ingredient supplier $130$, and/or can automatically provide the customer $110(a)$-$110(n)$ with the document. The ingredient supplier $130$ can respond to the request to provide the document. In other instances, the supplier portal $120$ may determine that it has previously received the document from the ingredient supplier $130$, and may automatically forward the document to the customer $110(a)$-$110(n)$.

While described predominantly with reference to ingredient suppliers that produce and/or sell ingredients relating to the production or sale of food goods, and customers associated with those ingredient suppliers, in some implementations the described subject matter may be equally relevant to other items, industries, or parties. For example, the described systems and methods relating to an ingredient may be equally applicable to other items or consumer products, such as goods relating to the packaging of food goods, toys, consumer electronic devices, living plants or animals (e.g. livestock or seafood), fluids, containers, fruits or vegetables, pharmaceuticals, vehicles, or a group, batch, lot, cluster, or other plurality of items or consumer products. Similarly, an ingredient may represent an intangible item, such as an electronic mail message, a virtual item in a virtual universe (such as a virtual item purchased in a software environment, e.g., a video game environment or other online environment), a right, a title, or an obligation. A group of ingredients includes one or more similar or dissimilar ingredients.

FIGS. 2A-2J illustrate a series of user interfaces for a vendor portal, such as the supplier portal $120$, for providing document management services to ingredient suppliers and their customers. For example, the user interfaces shown in FIGS. 2A-2J may be presented to an ingredient supplier $130$ accessing the supplier portal $120$ of FIG. 1, where the user interfaces of FIGS. 2A-2J may enable the ingredient supplier $130$ to identify one or more customers $110(a)$-$110(n)$, identify particular ingredients supplied to each of the customers $110(a)$-$110(n)$, identify and respond to requests for documents that are associated with ingredients supplied to the customers $110(a)$-$110(n)$, or to perform other document management operations.

FIG. 2A illustrates a user interface that identifies customers that purchase one or more ingredients from an ingredient supplier. For example, the user interface shown in FIG. 2A may be presented to the ingredient supplier $130$ when the ingredient supplier $130$ logs in or otherwise accesses the supplier portal $120$. As shown, the user interface shown in FIG. 2A identifies the customers "American Earth Foods," "Byco," "Clementine Snacks NA," "Flavor Chain Ingredients," "Hi American Products," and "Hondo Food Distributors" that are customers of "Supplier ABC." Each of these customers may correspond to the customers $110(a)$-$110(n)$ of FIG. 1, such that each of these customers may purchase one or more ingredients that are produced and/or sold by "Supplier ABC." For example, one or more ingredients that are produced and/or sold by the ingredient supplier "Supplier ABC" may include one or more ingredients relating to food production, e.g., wheat, high fructose corn syrup, etc., and/or one or more goods relating to the packaging of food, e.g., containers, food wrap, etc. The user interface of FIG. 2A may include one or more links, such as the links "Home," "My Documents," "My Account," and "Help" that provide a user of the supplier portal $120$ to view additional information.

The interface shown in FIG. 2A may further include additional information or capabilities relating to the use of the supplier portal by an ingredient supplier. For example, the user interface of FIG. 2A may include one or more links, such as the links "Home," "My Documents," "My Account," and "Help" that allow a user of the supplier portal $120$ to navigate to other information or other functionalities of the supplier portal 120. The interface shown in FIG. 2A may further include information relating to an account held by an ingredient supplier, such as the ingredient supplier 130. Such information may include, for example, a name of an account holder or account associated with the ingredient supplier, e.g., "John Doe," an address associated with the account holder or account, e.g., "1111 Brokaw Avenue, San Jose Calif. 96752, USA," a telephone number associated with the account holder or account, e.g., "555-555-5555," an email address associated with the account holder or account, e.g., "john@example.com," or other information, e.g., an account password expiration date, alternate contact information, etc.

While the interface shown at FIG. 2A includes information associated with a name of an account holder or account associated with the ingredient supplier, in other implementations the information associated with an account that is associated with the ingredient supplier may include information that specifies a group of one or more individuals, an entity, or a group of entities. For example, the account information shown at FIG. 2A may be assigned with a division of the ingredient supplier, e.g., a division of "Supplier ABC," may be associated with the supplier as an entity, e.g., where the account is specific to "Supplier ABC" as a whole, may be specific to a group of suppliers, e.g., a group of suppliers to which "Supplier ABC" is a member, or may be associated with other groups of individuals or entities.

Figure 2B:
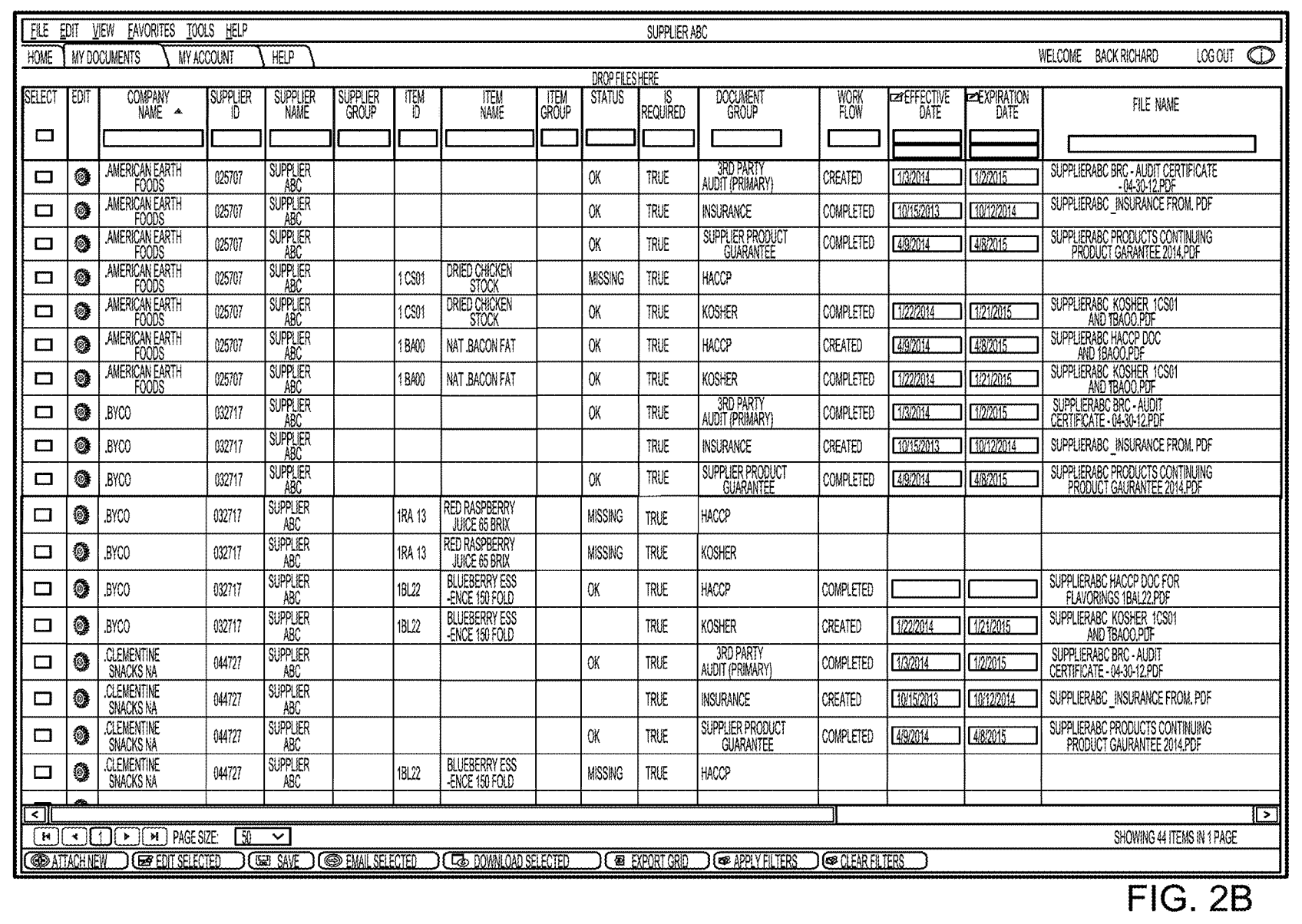

FIG. 2B shows a user interface associated with a "My Documents" portion of the supplier portal. For example, a user of the supplier portal 120 who is presented with the user interface of FIG. 2A may select the "My Documents" link to be presented with the user interface shown in FIG. 2B. The user interface of FIG. 2B identifies the one or more documents associated with each of the ingredients produced and/or sold by the ingredient supplier 130. For example, the user interface includes documents associated with the ingredients "Dried Chicken Stock," "Nat. Bacon Fat," "Red Raspberry Juice 65 Brix," and "Blueberry Essence 150 Fold." Additionally, the user interface of FIG. 2B identifies a number of other documents that are not associated with a particular ingredient, such as audit certificates, insurance forms, product guarantees, and the like. The user interface of FIG. 2B further includes additional information associated with each of the documents that are associated with the ingredient supplier 130 and that are accessible by the supplier portal 120, such as information indicating the customer name (e.g., "American Earth Foods," "Byco," and "Clementine Snacks NA"), information identifying one or more supplier identification numbers associated with "Supplier ABC" (e.g., the supplier identification number "025707"), ingredient identification numbers associated with each of the ingredients (e.g., the ingredient identification number "1CS01" associated with the ingredient "Dried Chicken Stock"), a status identifier associated with the document (e.g., "OK" or "Missing"), an indication of whether the document is a required document, a document group that classifies documents by type (e.g., "3rd Party Audit," "Insurance," "Supplier Product Guarantee," "HACCP, "Kosher," etc.), a work flow indicator identifying a status of the document (e.g., "Created" or "Completed"), an effective and expiration date for the document, and a file name for the document. Other information may be displayed in the interface of FIG. 2B, for example, information relating to a description of a document, information identifying a particular user associated with an ingredient supplier that downloaded a document, information indicating when the document was last downloaded, information indicating when or by whom a document was acknowledged as having been received or a request for the document was acknowledged, etc. In some cases, the user interface of FIG. 2B can include a link to each of the documents shown in the user interface, such that a user selection of a link can allow the user to access the document, for example, by downloading a copy of the document. More, less, or different information associated with the one or more documents may be presented at the user interface shown in FIG. 2B.

The interface shown in FIG. 2B may further include information or capabilities relating to operations that a user can perform on a particular document that is identified in the interface. For example, the interface may include capabilities to attach or upload a new document to the supplier portal 120, to edit a particular document that is listed in the interface, to save edits made with respect to a particular document that is listed in the interface, to email a particular document included in the interface to one or more users, or to download and/or save a particular document that is included in the interface, e.g., locally on a user's computer or on another storage device. The interface of FIG. 2B may also include capabilities to export the information shown in the interface, for example, to export the information "grid" shown in FIG. 2B to a particular file or file type that is accessible outside of the supplier portal 120. Additionally, the interface may include links that enable a user to apply filters to the set of documents identified in the user interface and/or clear filters applied to the display of documents in the user interface. The user interface of FIG. 2B can include a "Select" option for each of the documents identified in the interface, such that choosing the "Select" option associated with one or more particular documents, e.g., by clicking on a radio button associated with the "Select" option for each of the documents, can enable the user to perform one of such operations on the one or more selected documents.

For example, in some instances, a user accessing the user interface of FIG. 2B may be capable of filtering the documents displayed in the user interface. The user may be able to filter by one or more particular attributes of the documents, such as a document's associated company name, associated supplier identification number, supplier name, supplier group, item identification code, item name, item group, item status, item requirement indicator, document group, work flow status, effective date, expiration date, or file name. In some instances, a user may be able to filter the documents displayed in the user interface based on more than one factor simultaneously.

For example, as shown in FIG. 2C, a user has filtered the documents displayed in the user interface based on a status identifier of the documents. Specifically, the user has filtered the documents displayed in the user interface such that only those documents that have a status of "Missing" are displayed. As shown in the user interface of FIG. 2C, those documents associated with other status identifiers, such as "OK," are no longer displayed in the user interface. Based on a user filtering the documents displayed in the user interface, the information displayed about each of the documents may remain the same or may change. For example, as shown in FIG. 2C, the displayed information about the documents has been expanded to include data fields that indicate a description of the document, when the document was last downloaded, who downloaded the document most recently, who acknowledged the document most recently, or when the document was most recently acknowledged.

As shown in FIG. 2D, the user has further filtered the documents displayed in the user interface. Specifically, the documents displayed in the user interface are now filtered based on both the status identifier "Missing," and further based on the document group identifier "HACCP." Thus, each of the documents displayed in the user interface of FIG. 2D is associated both with a "Missing" status identifier and is a part of the "HACCP" document group.

Figure 2E:
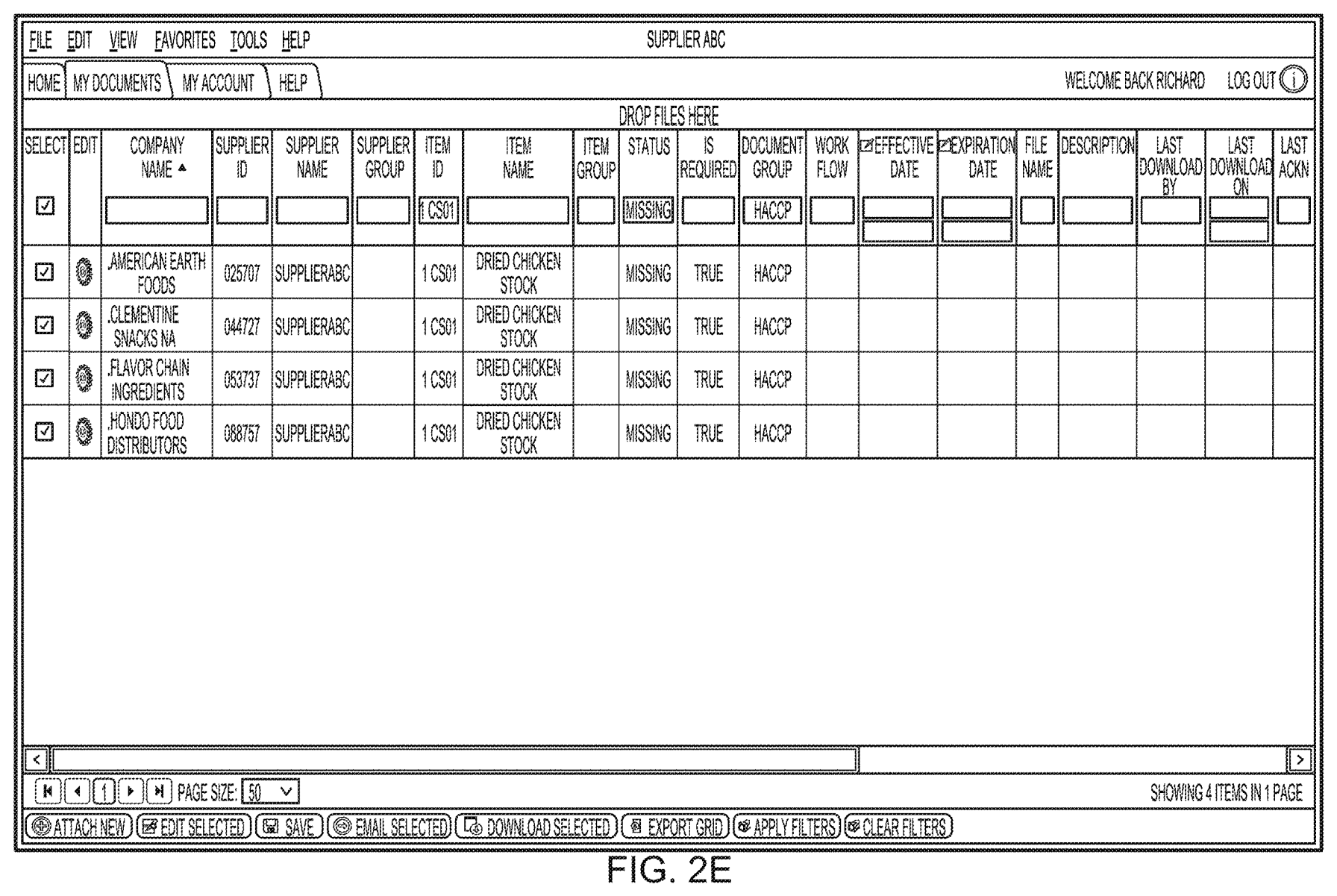

As shown in FIG. 2E, the user has further filtered the documents displayed in the user interface, which are now filtered based on three criteria. Specifically, the documents displayed in the user interface shown in FIG. 2E have been filtered based on the item identifier "1CS01," the status identifier "Missing," and the document group identifier "HACCP." In some instances, a user may filter the documents presented in the user interface by selecting a particular option from a menu of options, or by manually entering a particular filter term. For instance, the user may select the item identifier "1CS01" from a drop down menu that includes the item identifiers, "1CS01," "1BA00," "1RA13," and "1BL22," or the user may manually enter "1CS01" by typing the filter term "1CS01" in an entry field.

Figure 2F:
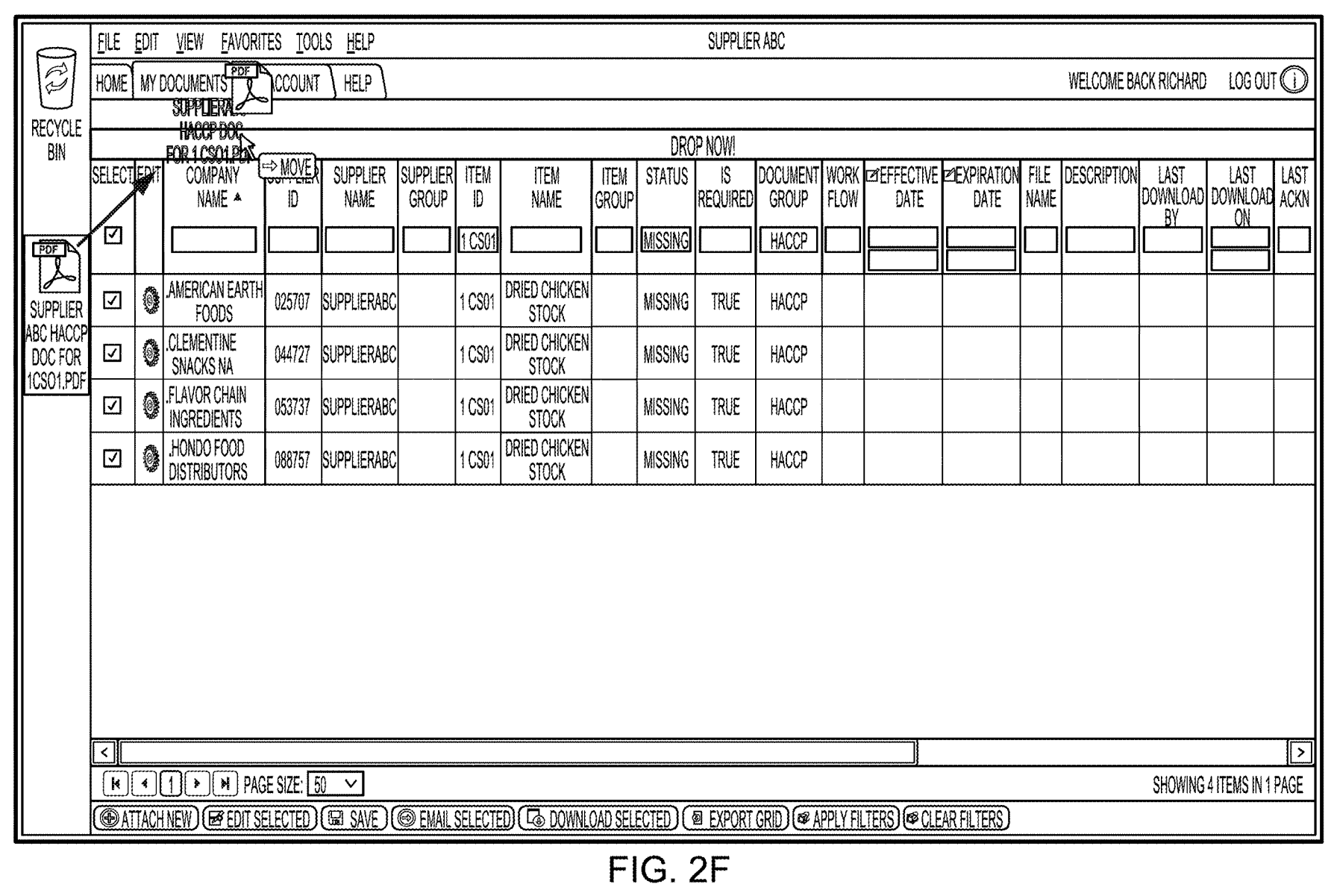

FIG. 2F illustrates a user interface that can enable a user to provide a new document to the supplier portal 120. For example, a user of the supplier portal 120 may upload a new document to the supplier portal 120 based on the user performing the operations shown in FIG. 2F. Specifically, as shown in FIG. 2F, a user may perform a "drag and drop" operation on a particular file to provide a new document to the supplier portal 120. The user may access the file associated with the new document as an icon, for example, an icon on a desktop or an icon or entry in a document folder. In other implementations, the user may access the file associated with the new document by locating an item in a list, e.g., as a file listed in a menu, may access a link associated with the document, e.g., a uniform resource locator (URL) or a link indicating a path to the document, or may otherwise access the file associated with the new document. In some instances, the file associated with the new document may be a file locally stored on the user's machine, or may be a file that is remotely accessible by the user (e.g., at a remote database). The user may be able to perform the "drag and drop" operation at a particular portion of the user interface shown in FIGS. 2B-2E, such as the portion of the user interfaces of FIGS. 2B-2E labeled "Drop Files Here," to cause the particular file associated with the new document to be uploaded to the supplier portal 120. In some instances, based on the user beginning the "drag and drop" operation as shown in FIG. 2F, the "Drop Files Here" region may be highlighted using a different color, e.g., the "Drop Files Here" region may typically be highlighted using a first color and may change to a second color when a user begins the "drag and drop" operation, or using a different textual message, e.g., the message "Drop Now!" displayed in FIG. 2F may be presented in lieu of the "Drop Files Here" message displayed at FIGS. 2B-2E. In some implementations, providing the new document to the supplier portal 120 may cause a copy of the user-selected file to be generated, and the duplicate file provided to the supplier portal 120, or may remove the file from its current location (e.g., on the user's machine) and provide the file to the supplier portal 120 such that the file is no longer accessible from the file's originating location.

While described above with respect to a user performing a "drag and drop" operation to provide a file associated with a document to the supplier portal 120, in other implementations, the user may perform other operations to provide a file to the supplier portal 120. For example, a user may manually upload a file associated with a document to the supplier portal 120 by using an interface or plugin within the supplier portal 120 that enables the user to select and upload a particular file, e.g., an "attach new" or "browse-to-upload" mechanism. In other examples, a user may provide a link to a particular file associated with a document, e.g., a document path or URL, and the supplier portal 120 may access the file associated with the link to locate and upload the file. In practice, other methods may be implemented in the supplier portal 120 that enable a user associated with an ingredient supplier 130 to identify and provide a particular file associated with a document to the supplier portal 120.

Figure 2G:
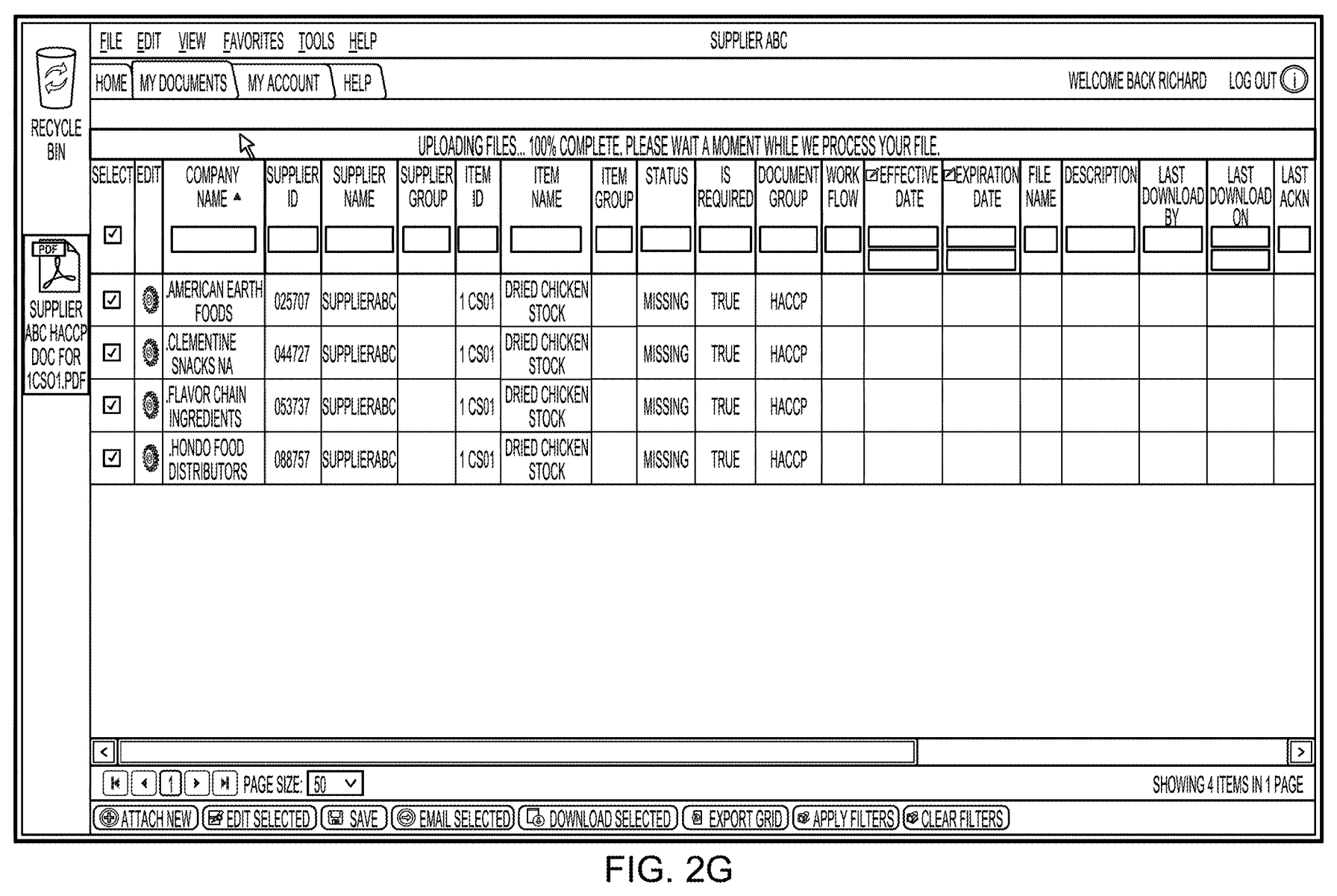

Based on a user performing a "drag and drop" or other operation to provide a new document to the supplier portal 120, a message may be output to the user as shown in FIG. 2G that indicates that the new document is being processed to make the document accessible from the supplier portal 120. For example, the message "Uploading Files . . . 100% Complete. Please wait a moment while we process your file" may be output at the user interface of the supplier portal 120, indicating that the new document is being processed in order to make the file accessible via the supplier portal 120.

In some implementations, processing a new document involves associating the new document with one or more records maintained at the supplier portal 120. For example, the new document may be associated with one or more company names, supplier identification numbers, supplier names, supplier groups, item identification numbers, item names, item groups, status identifiers, requirement identifiers, document group identifiers, work flow status identifiers, effective dates, expiration dates, file names, etc. In some implementations, a document may be automatically associated with one or more records maintained by the supplier portal 120 or one or more attributes, e.g., identifiers.

For example, as shown in FIGS. 2F and 2G, the documents displayed in the user interface have been filtered based on the item identification number "1CS01," the status identifier "Missing," and the document group identifier "HACCP." Based on the user providing the new document to the supplier portal 120, the supplier portal 120 may associate the new document with records that correspond to the document filters and/or may associate the new document with attributes corresponding to the documents displayed in the user interface based on the filtering. For example, the documents shown in the interface at FIG. 2E may each be supplied by "Supplier ABC," may have an item identifier of "1CSO1," may be associated with an item name of "dried chicken stock," and may be associated with a document group of "HACCP." Based on a user uploading a document, the document may be automatically assigned one or more of these attributes. Additionally, a file uploaded to the supplier portal 120 may be renamed or otherwise modified by the supplier portal 120. For example, a user may "drag and drop" or otherwise upload a file with an arbitrary name to the supplier portal 120, and the supplier portal 120 may rename the file to a name that is more characteristic of the document, based on the one or more attributes assigned to the file or one or more attributes on which the user has filtered the documents. For example, an arbitrary file may be uploaded to the supplier portal and renamed as "Supplier ABC HACCP Doc for ICS01," based on the user uploading the document while filtering the documents displayed in the interface of FIG. 2H based on the item identifier "1CS01," the document group "HACCP," and based on the user being associated with "Supplier ABC."

In some implementations, the supplier portal 120 may process an uploaded document file to determine information about the document, such as attributes of the document, based on the document's content. For example, the supplier portal 120 may perform an optical character recognition (OCR) process on the document to identify information about the document, e.g., that the document is likely associated with the item identifier "1CS01" based on detecting the presence of "1CS01" in the document text. The supplier portal 120 may perform other operations while scrubbing the document file to determine attributes of the document, for example, by performing image feature matching on the document to identify various images in the document that suggest certain attributes of the document, etc.

Figure 2H:
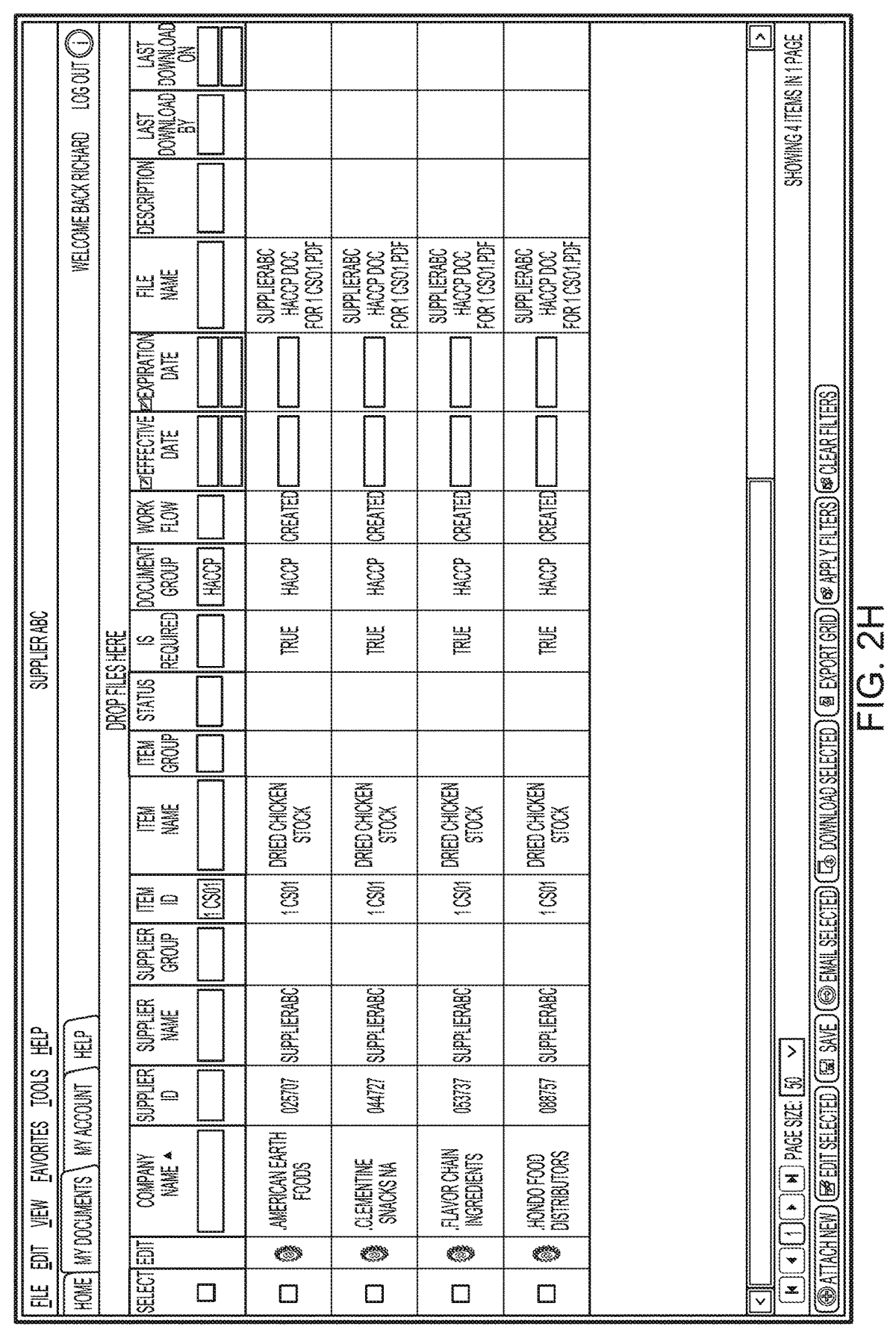

Additionally, in some implementations, an uploaded document may be linked to one or more other records or requests, e.g., a request for a document that is associated with a "Missing" identifier. For example, as shown in FIG. 2H, based on the user providing the file entitled "SupplierABC HACCP Doc for 1CS01" to the supplier portal 120, the new document associated with the file may be associated with each of the four documents displayed in the user interface. Thus, the new document associated with the file may be assigned attributes corresponding to those of the four documents displayed in the user interface and/or the attributes upon which the displayed documents in the user interface have been filtered.

Additionally, uploading the document to the supplier portal 120 may cause the documents identified in the interface shown in FIG. 2H to be updated. For example, based on the user uploading the document "SupplierABC HACCPDoc for 1CS01" to the supplier portal 120 while the documents displayed at the interface are filtered to include only documents that are identified as "Missing," that are associated with an item identifier of "1CS01" and that are a part of the "HACCP" document group, the supplier portal 120 may update the entries included in the interface to indicate that the "work flow" status of the documents is "created," to indicate that the file name of the created document is "SupplierABC HACCP Doc for 1CS01.pdf" and to include links to view the created documents.

In some implementations, uploading a document may cause the document to be automatically provided to one or more customers in response to requests for a particular document. For example, based on the user filtering the documents identified in the interface shown in FIG. 2H to include only those documents that are labeled as "Missing," are associated with an item identifier of "1CS01" and are in the "HACCP" document group, the supplier portal 120 may determine that the uploaded document was likely uploaded to satisfy the "Missing" document condition, and may therefore transmit the uploaded document to the companies that require the particular document, e.g., the companies "American Earth Foods," "Clementine Snacks," "Flavor Chain Ingredients," and "Hondo Food Distributors." In some instances, the document may be provided to the one or more customers only after a user associated with the supplier confirms that the documents should be sent to the customers.

In some implementations, as described with respect to FIG. 2B, a user may be capable of performing operations on one or more documents that are displayed in the user interface. For example, as shown in FIG. 2I, each of the documents shown in a user interface of the supplier portal 120 may be associated with a "Select" option. The "Select" option may be associated with a radio button or other control for selecting a particular document record displayed in the user interface, a subset of document records displayed in the user interface, or all of the document records viewable in the user interface. A user associated with the ingredient supplier 130 and using the supplier portal 120 may select one or more documents by activating the "Select" control, for example, as shown in FIG. 2I. Based on the user selecting the one or more documents, the user may be able to perform operations with respect to the one or more documents, for example, editing one or more of the selected documents, saving one or more of the selected documents, email one or more of the selected documents, exporting one or more of the selected documents or information associated with one or more of the selected documents, etc. The user may elect to perform one or more of such operations with respect to selected documents by selecting a control associated with the operations, as shown at the bottom of the user interface illustrated in FIG. 2I.

In some implementations, the user may be able to modify one or more documents and/or information associated with one or more documents, and save the modifications to the one or more documents and/or the information associated with the one or more documents. For example, the user may be able to modify one or more of the documents identified in the interface of FIG. 2I and may be able to save the modifications through a single selection of the "Save" control shown at the bottom of FIG. 2I. In some implementations, a user may modify information associated with a document, such as a file name, item identifier, etc., by updating the data fields corresponding to those attributes that are provided in the interface. In some implementations, a user may modify a particular document by downloading the document, modifying it, and uploading a modified version of the document to the supplier portal 120, by modifying a version of the document that is maintained by the supplier portal 120, or by otherwise accessing and modifying the document stored by the supplier portal 120. In instances in which the same document is associated with one or more document records, e.g., such that a particular document associated with a particular ingredient must be provided to all customers who purchase that ingredient from the ingredient supplier 130, modifications to one instance of the document may be propagated across all instances of the document. For example, based on updating the instance of the document "SupplierABC HACCP Doc for 1CS01.pdf" that is associated with "American Earth Foods," the other instances of the same document, e.g., having the same name, that must be supplied to the other customers "Clementine Snacks," "Flavor Chain Ingredients," and "Hondo Food Distributors" may be updated to match the revised version of the document that is associated with "American Earth Foods." Similarly, modifications to particular attributes for a particular document that is provided to one or more customers may be updated based on the attributes of one instance of the document being altered. For example, if a user updates the document record for "SupplierABC HACCP Doc for 1CS01.pdf" that is associated with "American Earth Foods" to indicate that the document work flow has changed from "Created" to "Ready," the document records for the same document that are associated with "Clementine Snacks," "Flavor Chain Ingredients" and "Hondo Food Distributors" may also be updated from "Created" to "Ready." In some implementations, modifications to a particular document may cause a new document that includes the modifications to be created. In such an implementation, the original version of the document that does not include the modifications may be deleted, may be archived, or may be identified as a separate document from the document that includes the modifications.

Figure 2J:
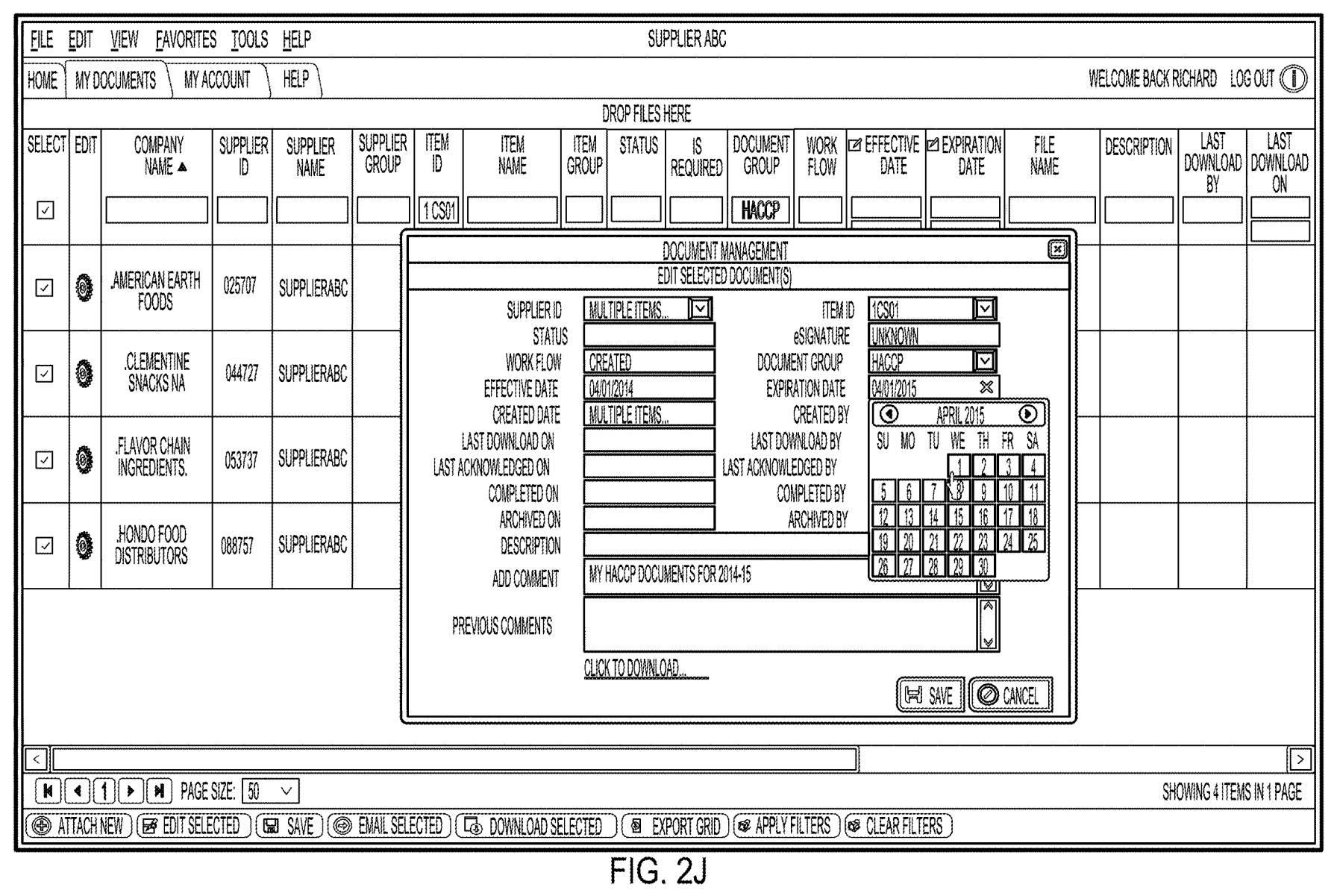

FIG. 2J presents an example of a user interface for editing one or more selected documents. For example, as shown in FIG. 2J, a user associated with the ingredient supplier 130 and using the supplier portal 120 may select the four documents shown in FIG. 2I, and may select the control to edit the one or more selected documents. Based on the user selecting the "Edit Selected" control, the user may be presented with the user interface shown in FIG. 2J. The user interface in FIG. 2J may allow the user to manually update attributes or other information associated the selected documents. In some instances, edits to the document records performed using the user interface of FIG. 2J may be applied to all or a subset of the selected documents. A user selection of a control to "save" or "cancel" the edits performed at the user interface of FIG. 2J may either effect or discard the edits entered by the user. Additionally, the interface of FIG. 2J or a similar interface may enable the user to edit the content on certain documents. For example, the user may be presented with an interface that includes the content of the document such that the user can update the content of the document, e.g., in a manner similar to a word processor application. Additionally or alternatively, the user may be able to access a version of the document, for example, by selecting the "Click to Download" control shown in the interface of FIG. 2J to download an editable version of the document. The user may modify the content of the document, and may subsequently upload a modified version of the document, for example, by uploading the modified version of the document using a control presented in the interface of FIG. 2J. The user may be able to upload the modified version of the document and to save the modifications to the document.

Figure 3A:
Figure 3C:
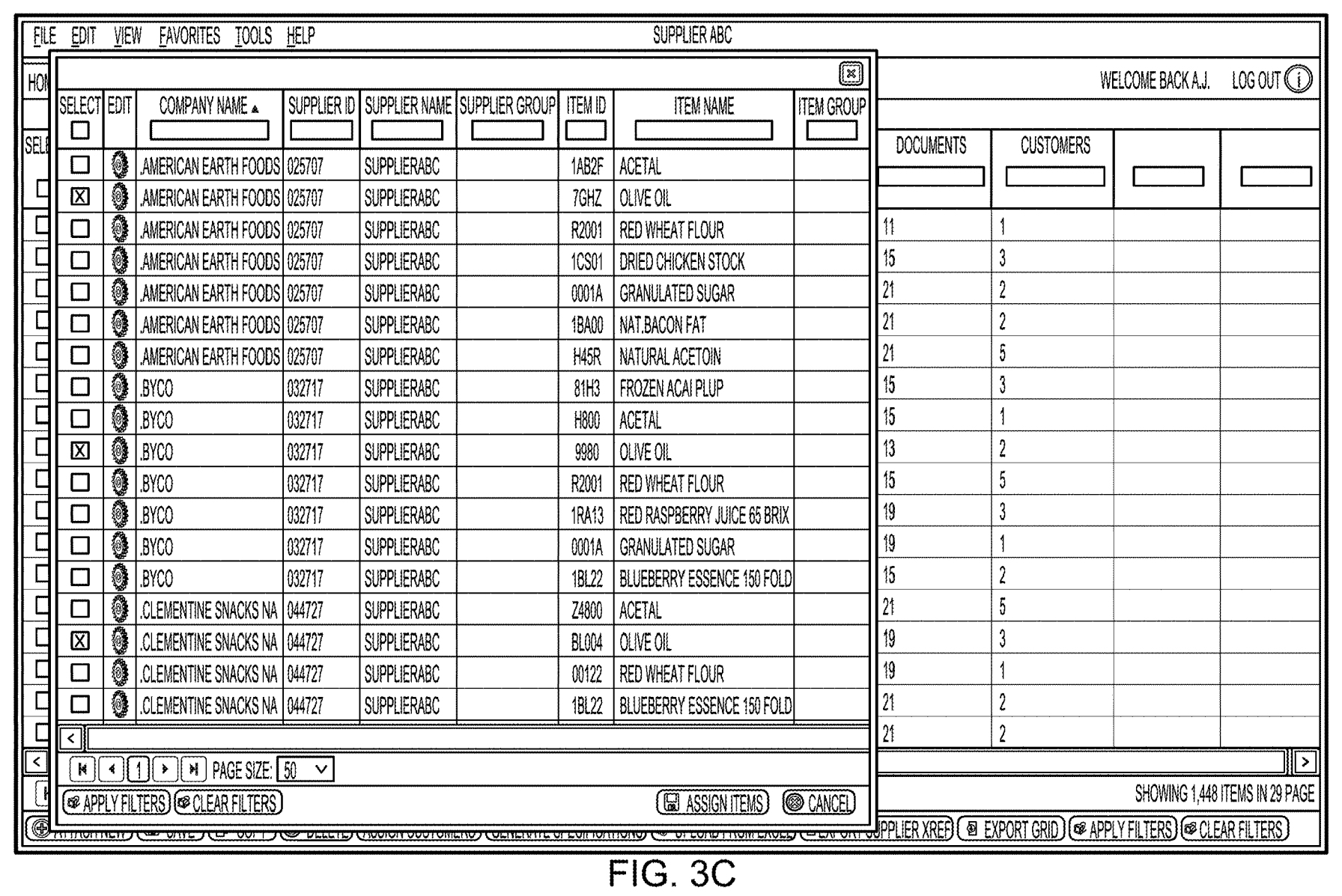

FIGS. 3A-3C illustrate example user interfaces for a supplier portal that provide post-once document management services to ingredient suppliers. For example, the supplier portal 120 may provide capabilities enabling the ingredient supplier 130 to manage documents associated with ingredients that the ingredient supplier 130 produces and/or sells, including providing relevant documents to one or more customers 110(a)-110(n). For example, the supplier portal 120 can provide capabilities that enable the supplier portal 120 to transmit one or more documents to a particular customer 110(a)-110(n), the one or more documents being associated with an ingredient that the particular customer 110(a)-110(n) purchases from the ingredient supplier 130. In some instances, the post-once capabilities of the supplier portal 120 can enable relevant documents to be automatically provided to the appropriate customers, based on the customers requesting the relevant documents, based on the customer beginning to purchase a particular ingredient from the ingredient supplier 130 that they have not previously purchased, based on a new version of the relevant documents becoming available, based on the customer placing a new order for the ingredient, based on one or more authorities requesting or requiring the documents to be provided to the customers, or based on other factors.

For example, as shown in FIG. 3A, a user interface of the supplier portal 120 can include a "My Items" interface that identifies one or more ingredients that the ingredient supplier 130 produces and/or sells. For example, the one or more ingredients that the ingredient supplier 130 produces and/or sells may include one or more ingredients relating to food production and/or may include one or more goods relating to the packaging of food. The user interface of FIG. 3A can identify the ingredients based on a group associated with the ingredients, e.g., "Sub-Assembly" or "Oil," a numeric identifier associated with the ingredient, e.g., "001-Fin Ingred," "1928OL," etc., a name of the ingredient, a description of the ingredient, a date that the record associated with the ingredient was created, a number of documents associated with the ingredient, the number of customers that purchase the ingredient, or can identify the ingredients using other attributes.

In some implementations, the information used by an ingredient supplier to identify a particular item that the ingredient supplier produces and/or sells can be unique to the ingredient supplier. For example, the ingredient supplier can assign a numeric identifier to each of the ingredients that it produces and/or sells that are unique to the ingredient supplier. Such an identifier for a particular ingredient can be unique to the ingredient supplier in that the identifier is not necessarily used by one or more customers that purchase the particular ingredient. For example, the ingredient supplier may identify "Olive Oil" using the ingredient identifier "1928OL," while one or more customers who purchase the "Olive Oil" or one or more other ingredient suppliers that may supply the same "Olive Oil" may use different identifiers.

Additionally, in some implementations of the described subject matter, to facilitate the management of documents relating to ingredients purchased by one or more customers 110(a)-110(n), the supplier portal 120 can enable a customer 110(a)-110(n) to provide information to the supplier portal 120 that identifies the one or more ingredients that the customer 110(a)-110(n) purchases that are produced and/or sold by the ingredient supplier 130. For example, the customer 110(a)-110(n) may be able to provide information to the supplier portal 120 that identifies the ingredients and/or one or more attributes associated with the ingredients that the customer 110(a)-110(n) purchases from the ingredient vendor 130. In some instances, such attributes can include an item identification number associated with a particular ingredient, a name associated with the particular ingredient, and/or other attributes that identify the particular ingredient.

In some instances, the information provided by a customer 110(a)-110(n) that identifies a particular ingredient purchased from the ingredient supplier 130 can be unique from the information used to identify the ingredient by the ingredient supplier 130. Rather, each customer 110(a)-110(n) who purchases a particular ingredient from an ingredient supplier 130 may uniquely identify the particular ingredient, such that the supplier portal 120 maintains a number of different identifiers, and other identification information, that refer to the same ingredient.

To enable the supplier portal 120 to provide the customers 110(a)-110(n) relevant documents relating to the particular ingredient, the supplier portal 120 may provide means for associating information identifying an ingredient provided by an ingredient supplier 130 and information identifying the same ingredient provided by a customer 110(a)-110(n). For example, as shown in FIG. 3B, a particular customer "Byco" may purchase an ingredient "Olive Oil" from "Supplier ABC," and may assign an item identification code to the ingredient of "9980." To provide for proper document management, the supplier portal 120 may allow the item identification code "9980" assigned to "Olive Oil" by the customer "Byco" with the item identification code "1928OL" assigned to the ingredient "Olive Oil" by the ingredient supplier "Supplier ABC." By correlating these two item identification numbers, a request received from the customer "Byco" for documents relating to the ingredient "Olive Oil" having item identification code "9980" is properly interpreted as a request for the supplier "Supplier ABC" to provide the documents relating to "Olive Oil" having an item identification code of "1928OL" to the customer "Byco." In some implementations, other information in addition or in lieu of item identification numbers may be correlated for one or more attributes and/or one or more customers 110(*a*)-110(*n*). For example, the same ingredient "Olive Oil" can be also be purchased by the customers "American Earth Food," who assigns the ingredient "Olive Oil" an item identification number of "7 GHZ," and ":Clementine Snacks NA," who assigns the ingredient "Olive Oil" an item identification number of "BL004," and these item identification numbers can be further correlated to the item identification numbers for "Olive Oil" of "998" and "1928OL."

Based on correlating the item identification numbers or other information identifying a particular ingredient produced and/or sold by the ingredient supplier 130 across multiple customers, documents related to the particular ingredient can be provided to all of the customers purchasing that ingredient. For example, as shown in FIG. 3C, based on 3 customers purchasing "Olive Oil" from "Supplier ABC," namely the customers "Byco," "American Earth Foods," and "Clementine Snacks NA," documents that relate to the ingredient "Olive Oil" can be provided to each of these customers, such that traceability is maintained throughout. In some implementations, the supplier portal may maintain information that associates a supplier, an ingredient, and a document or document type. The supplier portal can generate this association for each of one or more documents for each of one or more ingredients produced and/or sold by the supplier. By associating this information, such that a particular document is associated with both the ingredient and the supplier of that ingredient, the supplier portal can identify and provide a customer who purchases the ingredient from the supplier with all of the documents that are related to the ingredient sold by the supplier.

In some implementations, the correlation of ingredient identifiers may be expanded to include multiple ingredient suppliers 130 of a particular ingredient. For example, based on two or more ingredient suppliers 130 selling a particular type of "Olive Oil" to one or more customers, with each ingredient supplier 130 using a unique identifier to identify the particular type of "Olive Oil," the supplier portal 120 may associate each of the identifiers used by the customers 110(*a*)-110(*n*) and the ingredient suppliers 130 to identify the particular type of "Olive Oil." While discussed predominantly with respect to identifiers used to identify particular ingredients, the correlation of varying identifiers may be expanded to other attributes for a particular ingredient. For example, two or more different item names or item descriptions used by the customers 110(*a*)-110(*n*) of the ingredient supplier 130 may be correlated, e.g., such that an ingredient supplier 130 can respond to a request received from one customer relating to a particular type of olive oil that is described as "Olive Oil" by that customer 110(*a*)-110(*n*) and is described as "Extra Virgin Olive Oil" by another customer 110(*a*)-110(*n*) by providing a document relating to the particular type of olive oil to both customers 110(*a*)-110(*n*).

In some implementations, different customers 110(*a*)-110(*n*) using the supplier portal 120 can identify the same ingredient supplier 130 using different names, identifiers, or other information. Similarly, different ingredient suppliers using the supplier portal 120 can identify the same customer 110(*a*)-110(*n*) using the same name, identifier, or other information. The supplier portal 120 can determine that the different identifiers or other information used to identify a particular ingredient supplier 130 or customer 110(*a*)-110(*n*) refer to the same ingredient supplier 130 or customer 110(*a*)-110(*n*), and can associate the different identifiers or other information such that an ingredient supplier 130 or customer 110(*a*)-110(*n*) can be identified using any of the different identifiers or other information. Thus, a request placed by two different customers 110(*a*)-110(*n*) for a particular document from the same ingredient supplier 130 but using different identifier information for the ingredient supplier 130 can be processed by the supplier portal 120 as if both of the requests identified the ingredient supplier 130 using the same identifier.

The correlation of identifiers used to identify particular ingredients, customers, or ingredient suppliers can be used to provide a number of different services through a supplier portal. For example, an ingredient supplier 130 or customer 110(*a*)-110(*n*) can provide information to the supplier portal 120 that identifies a particular ingredient. If the ingredient has been recorded by the supplier portal 120 previously, e.g., by another ingredient supplier 130 or customer 110(*a*)-110(*n*), the supplier portal 120 can correlate the identified ingredient to the previously recorded ingredient. For example, the supplier portal 120 may correlate an identifier of the ingredient provided by the customer 110(*a*)-110(*n*) or the ingredient supplier 130 to the previously recorded identifier of the ingredient. The supplier portal 120 may additionally or alternatively identify one or more documents that are required or are typically requested and/or provided regarding the particular ingredient. For example, a customer 110(*a*)-110(*n*) purchasing a particular ingredient may be provided with information identifying one or more documents that other customers typically request or are required to obtain when they purchase the particular ingredient, such that the customer 110(*a*)-110(*n*) may request those documents from the ingredient supplier 130 that sold them the particular ingredient. Similarly, based on an ingredient supplier 130 selling a particular ingredient, the ingredient supplier 130 may be presented with information identifying and/or enabling the ingredient supplier 130 to provide a customer 110(*a*)-110(*n*) who purchased the particular ingredient with documents that are typically sent and/or are required to be provided to purchasers of the particular ingredient.

Additionally, the supplier portal can detect certain events relating to a particular ingredient, ingredient supplier, or customer, and can provide information or perform operations based on the detected events. For example, based on determining that multiple ingredient suppliers of a particular ingredient have provided customers with a document relating to the particular ingredient, the supplier portal may prompt a particular ingredient supplier of the particular ingredient or customer who purchases the particular ingredient to provide or request the document relating to the particular ingredient. Similarly, based on determining that an organization that oversees the food industry has provided a warning or requested information from one or more customers and/or ingredient suppliers of a particular ingredient, the customers and/or ingredient suppliers can be provided, e.g., as a notification or alert, a request for one or more documents relating to the particular ingredient. In other examples, notifications and/or alerts can be provided to ingredient suppliers and/or customers based on determining that a particular document needs to be renewed or updated, based on determining a pattern relating to the exchange of documents relating to a particular ingredient, e.g., by other suppliers or purchasers of the particular ingredient, or based on other information. In some instances, instead of providing a notification or alert, the supplier portal may automatically provide one or more documents from an ingredient supplier to a customer, or may request one or more documents from an ingredient supplier on behalf of the customer.

In some implementations, the supplier portal can be integrated with additional information relating to a particular customer, a particular ingredient supplier, or a particular ingredient, and can provide information or perform operations based on the additional information. For example, the supplier portal may have access to inventory information for a particular ingredient supplier and/or customer, and may be able to provide information or perform operations based on the information. For instance, the supplier portal may determine the number of different customers that a particular ingredient supplier has provided documents to in relation to a particular ingredient, to determine or provide information indicating that the ingredient supplier's inventory of the particular ingredient is likely low, or that they supplier may benefit by increasing their sale of the product. Similarly, the supplier portal may determine that a customer's inventory of a particular ingredient is likely low based on the customer not requesting documents relating to the particular ingredient for a threshold period of time. In other instances, the supplier portal may be able to identify patterns of the sale and purchase of a particular ingredient based on information relating to the documents provided to and/or requested by purchasers of the particular ingredient. In other implementations, the supplier portal may be capable of detecting possible problems with a particular ingredient based on the documents. For example, the supplier portal may be capable of detecting a possible problem with an ingredient based on determining that a number of documents relating to the ingredient indicate that the ingredient is close to or out of specification. In other implementations, the supplier portal may use the information relating to the exchange of documents between ingredient suppliers and customers to determine advertisements for the particular ingredient suppliers and/or customers, to suggest prospective ingredient suppliers to customers, or to suggest prospective customers to ingredient suppliers. The supplier portal may perform other analyses on the documents provided to the supplier portal and the exchange of documents between ingredient suppliers and customers to reach provide other services or information to users of the supplier portal.

In some implementations, as described, one or more different versions of a particular document may exist. For example, a document may be associated with an expiration date, such that a new version of the document is provided or becomes available periodically, at a time when the document is set to expire, when a new version of the document is provided or becomes available, or based on other circumstances. In other examples, multiple versions of a document may exist based on one or more modifications being applied to the document, as discussed with reference to FIG. 2I. In instances in which multiple versions of a particular document may exist or become available, the supplier portal may archive one or of the versions of the document. For example, the supplier portal may maintain or have access to an archive of previous versions of a particular document in addition to maintaining or having access to a most recent version of the particular document. In some examples, the supplier portal may enable one or more suppliers and/or customers to access one or more archived versions of the particular document. For example, a particular customer may be able to receive and/or access an HACCP document for a particular ingredient that periodically expires, or that must otherwise be periodically updated or replaced. The customer may be capable of accessing a most recent version of the HACCP document and may further be able to access one or more archived versions of the HACCP document. Similarly, a supplier that produces and/or sells the particular ingredient may be able to access the most recent version of the HACCP document and may additionally be capable of accessing one or more archived versions of the HACCP document.

In some implementations, the supplier portal may identify an expiration date associated with a particular document. An expiration date may refer to a date when a document or a particular version of a document is no longer valid, must be replaced, must be updated, when fees associated with the document are due, etc. Based on the supplier portal determining that the document is about to expire or has expired, the supplier portal may provide one or more customers and/or suppliers with a new version of the document, with an updated version of the same document, with a different document that replaces the expired document, or may perform other operations to address the expiration of the document. For example, the supplier portal may determine that a particular ingredient is associated with an HACCP document that has an expiration date. Based on determining that the expiration date for the HACCP document is approaching or has passed, the supplier portal can provide a new version of the HACCP document to one or more suppliers of the particular ingredient and/or customers who purchase the particular ingredient. In some instances, a document may be associated with different expiration dates, where the expiration dates may be unique to one or more particular suppliers and/or customers. In these examples, the supplier portal may provide a new version of the document to the suppliers and/or customers at different times, depending upon the expiration date of the document associated with a particular supplier and/or customer. As an example, a new version of an HACCP document that must be renewed annually and that expires on July 1 for a first customer and January 1 for a second customer may be provided to the first customer on June 30 and may be provided to the second customer on December 31 of each year. In some implementations, the documents provided to the first and second customers may be different versions of the same document. For example, a version of an HACCP document provided to the first customer may be assigned to the first customer and may have a first expiration date, e.g., may be assigned to "American Earth Foods" and have an expiration date of July 1, and another version of the HACCP document provided to the second customer may be assigned to the second customer and may have a second expiration date, e.g., may be assigned to "Clementine Snacks" and have an expiration date of January 1.

In some implementations, providing documents to a supplier or customer may be dependent upon the supplier or customer having a particular subscription or being a part of a particular group of members of a service associated with the supplier portal. In some implementations, a document may be provided to a particular supplier or customer at a different time from which it is provided to another supplier or customer, depending upon whether a supplier or customer has a particular subscription or is a part of a particular group of members of the service associated with the supplier portal. For example, if the first customer has a particular type of subscription or membership for the service associated with the supplier portal, new versions of a particular document may be provided to the customer automatically when the document is due to expire. However, if the second customer does not have the particular subscription or membership, or has a different subscription or membership, new versions of the particular document may only be provided to the second customer based on the second customer requesting the document, or may only be provided to the second customer based on other circumstances or criteria being satisfied.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method for associating, by a document management system and in a single session, a particular document with multiple document requesting entities using a single file uploading operation, the method comprising:
   providing, by the document management system, a document posting interface comprising (i) a first user interface region including one or more entity filtering controls for filtering document requesting entities based on one or more attributes of the document requesting entities, (ii) a second user interface region displaying representations of the multiple document requesting entities that satisfy one or more constraints specified by the one or more entity filtering controls, and (iii) a third user interface region including an upload status control that serves as a visual representation of a status of the single file uploading operation;
   in response to determining that the single file uploading operation has been manually initiated and that the single file uploading operation has not yet been completed, updating the upload status control in the third user interface region to display a message for aiding completion of the single file uploading operation; and
   in response to determining that the single file uploading operation has been manually initiated and that the single file uploading operation has been completed,
      (a) associating, in a database of the document management system and during the single session, the particular document with each of the multiple document requesting entities that satisfy the one or more constraints specified by the one or more entity filtering controls, and
      (b) updating:
         (i) the upload status control in the third user interface region to display a message indicating that the particular document is being associated, or has been associated, with the multiple document requesting entities that satisfy the one or more constraints specified by the one or more entity filtering controls included in the first user interface region, and
         (ii) the second user interface region to indicate that the particular document is being associated, or has been associated, with each of the multiple document requesting entities that satisfy the one or more constraints specified by the one or more entity filtering controls included in the first user interface region.

2. The method of claim 1, comprising renaming a file name associated with the particular document based at least on an identity of an entity that performed the single file uploading operation.

3. The method of claim 1, comprising renaming a file name associated with the particular document based at least on one or more of the constraints specified by the one or more entity filtering controls.

4. The method of claim 1, comprising deleting the particular document.

5. The method of claim 1, comprising, in a state when the single file uploading operation has been manually initiated and that the single file uploading operation has not yet been completed, one or more representations of one or more other document requesting entities that do not satisfy the one or more constraints specified by the one or more entity filtering controls are not displayed within the second user interface region.

6. The method of claim 1, comprising performing an optical character recognition process on the particular document, and renaming a file name associated with the particular document based at least on a result of the optical character recognition process.

7. The method of claim 1, comprising generating, for each of the multiple document requesting entities, a message indicating that the particular document has been associated with the document requesting entities in the database of the document management system.

8. The method of claim 1, wherein the single file uploading operation comprises a mouse-based, drag-and-drop gesture.

9. A computer-readable storage device storing instructions executable by one or more computers which, upon such execution, cause the one or more computers to perform operations for associating, by a document management system and in a single session, a particular document with multiple document requesting entities using a single file uploading operation, the operations comprising:

providing, by the document management system, a document posting interface comprising (i) a first user interface region including one or more entity filtering controls for filtering document requesting entities based on one or more attributes of the document requesting entities, (ii) a second user interface region displaying representations of the multiple document requesting entities that satisfy one or more constraints specified by the one or more entity filtering controls, and (iii) a third user interface region including an upload status control that serves as a visual representation of a status of the single file uploading operation;

in response to determining that the single file uploading operation has been manually initiated and that the single file uploading operation has not yet been completed, updating the upload status control in the third user interface region to display a message for aiding completion of the single file uploading operation; and in response to determining that the single file uploading operation has been manually initiated and that the single file uploading operation has been completed,
- (a) associating, in a database of the document management system and during the single session, the particular document with each of the multiple document requesting entities that satisfy the one or more constraints specified by the one or more entity filtering controls, and
- (b) updating:
  - (i) the upload status control in the third user interface region to display a message indicating that the particular document is being associated, or has been associated, with the multiple document requesting entities that satisfy the one or more constraints specified by the one or more entity filtering controls included in the first user interface region, and
  - (ii) the second user interface region to indicate that the particular document is being associated, or has been associated, with each of the multiple document requesting entities that satisfy the one or more constraints specified by the one or more entity filtering controls included in the first user interface region.

10. The device of claim 9, wherein the operations comprise renaming a file name associated with the particular document based at least on an identity of an entity that performed the single file uploading operation.

11. The device of claim 9, wherein the operations comprise renaming a file name associated with the particular document based at least on one or more of the constraints specified by the one or more entity filtering controls.

12. The device of claim 9, wherein the operations comprise deleting the particular document.

13. The device of claim 9, wherein the operations comprise, in a state when the single file uploading operation has been manually initiated and that the single file uploading operation has not yet been completed, one or more representations of one or more other document requesting entities that do not satisfy the one or more constraints specified by the one or more entity filtering controls are not displayed within the second user interface region.

14. The device of claim 9, wherein the operations comprise performing an optical character recognition process on the particular document, and renaming a file name associated with the particular document based at least on a result of the optical character recognition process.

15. The device of claim 9, wherein the operations comprise generating, for each of the multiple document requesting entities, a message indicating that the particular document has been associated with the document requesting entities in the database of the document management system.

16. The device of claim 9, wherein the single file uploading operation comprises a mouse-based, drag-and-drop gesture.

17. A document management system comprising one or more computers and one or more storage devices storing instructions that are operable, when executed by the one or more computers, to cause the one or more computers to perform operations for associating, in a single session, a particular document with multiple document requesting entities using a single file uploading operation, the operations comprising:

providing, by the document management system, a document posting interface comprising (i) a first user interface region including one or more entity filtering controls for filtering document requesting entities based on one or more attributes of the document requesting entities, (ii) a second user interface region displaying representations of the multiple document requesting entities that satisfy one or more constraints specified by the one or more entity filtering controls, and (iii) a third user interface region including an upload status control that serves as a visual representation of a status of the single file uploading operation;

in response to determining that the single file uploading operation has been manually initiated and that the single file uploading operation has not yet been completed, updating the upload status control in the third user interface region to display a message for aiding completion of the single file uploading operation; and in response to determining that the single file uploading operation has been manually initiated and that the single file uploading operation has been completed,
- (a) associating, in a database of the document management system and during the single session, the particular document with each of the multiple document requesting entities that satisfy the one or more constraints specified by the one or more entity filtering controls, and
- (b) updating:
  - (i) the upload status control in the third user interface region to display a message indicating that the particular document is being associated, or has been associated, with the multiple document requesting entities that satisfy the one or more constraints specified by the one or more entity filtering controls included in the first user interface region, and
  - (ii) the second user interface region to indicate that the particular document is being associated, or has been associated, with each of the multiple document requesting entities that satisfy the one or more constraints specified by the one or more entity filtering controls included in the first user interface region.

18. The system of claim 17, wherein the operations comprise renaming a file name associated with the particular document based at least on an identity of an entity that performed the single file uploading operation.

19. The system of claim 17, wherein the operations comprise renaming a file name associated with the particular document based at least on one or more of the constraints specified by the one or more entity filtering controls.

20. The system of claim 17, wherein the operations comprise deleting the particular document.

* * * * *